United States Patent
Fujishiro et al.

(10) Patent No.: US 10,750,542 B2
(45) Date of Patent: Aug. 18, 2020

(54) RADIO TERMINAL, BASE STATION, AND PROCESSOR

(71) Applicant: KYOCERA CORPORATION, Kyoto (JP)

(72) Inventors: Masato Fujishiro, Yokohama (JP); Kugo Morita, Higashiomi (JP); Hiroyuki Adachi, Kawasaki (JP); Noriyoshi Fukuta, Inagi (JP)

(73) Assignee: KYOCERA Corporation, Kyoto (JP)

(*) Notice: Subject to any disclaimer, the term of this patent is extended or adjusted under 35 U.S.C. 154(b) by 1 day.

(21) Appl. No.: 15/807,792

(22) Filed: Nov. 9, 2017

(65) Prior Publication Data
US 2018/0070383 A1 Mar. 8, 2018

Related U.S. Application Data

(63) Continuation of application No. PCT/JP2016/063394, filed on Apr. 28, 2016.
(Continued)

(51) Int. Cl.
*H04W 74/08* (2009.01)
*H04W 72/12* (2009.01)
(Continued)

(52) U.S. Cl.
CPC ....... *H04W 74/0833* (2013.01); *H04W 72/12* (2013.01); *H04W 72/1284* (2013.01); *H04W 74/004* (2013.01); *H04W 76/10* (2018.02)

(58) Field of Classification Search
CPC .......................... H04W 74/0833; H04W 72/12
See application file for complete search history.

(56) References Cited

U.S. PATENT DOCUMENTS

8,717,996 B2* 5/2014 Parkvall .............. H04W 74/004
370/329
8,743,797 B2* 6/2014 Park .................. H04W 72/0413
370/329
(Continued)

FOREIGN PATENT DOCUMENTS

JP 2013-528009 A 7/2013
WO 2014/030193 A1 2/2014
WO 2014088479 A1 6/2014

OTHER PUBLICATIONS

The extended European search report issued by the European Patent Office dated Mar. 2, 2018, which corresponds to European Patent Application No. 16796290.1-1215 and is related to U.S. Appl. No. 15/807,792.
(Continued)

*Primary Examiner* — Rasheed Gidado
(74) *Attorney, Agent, or Firm* — Studebaker & Brackett PC

(57) ABSTRACT

A radio terminal according to an embodiment includes a controller configured to control a random access procedure. The random access procedure includes first processing of transmitting a random access preamble to a base station, second processing of receiving a random access response from the base station, and third processing of performing uplink transmission to the base station based on the random access response. The controller is configured to notify, in the first processing or the third processing, the base station of an amount of uplink data in a transmission buffer of the radio terminal.

4 Claims, 12 Drawing Sheets

Related U.S. Application Data

(60) Provisional application No. 62/162,184, filed on May 15, 2015.

(51) Int. Cl.
*H04W 76/10* (2018.01)
*H04W 74/00* (2009.01)

(56) References Cited

U.S. PATENT DOCUMENTS

| | | | | |
|---|---|---|---|---|
| 9,787,456 | B2* | 10/2017 | Tan Bergstrom | H04L 43/16 |
| 2009/0201868 | A1* | 8/2009 | Chun | H04W 72/1278 |
| | | | | 370/329 |
| 2010/0091727 | A1* | 4/2010 | Ishii | H04W 72/04 |
| | | | | 370/329 |
| 2011/0310937 | A1* | 12/2011 | Lin | H04L 5/001 |
| | | | | 375/219 |
| 2012/0127930 | A1* | 5/2012 | Nguyen | H04W 74/002 |
| | | | | 370/329 |
| 2013/0039314 | A1 | 2/2013 | Prateek et al. | |
| 2013/0044708 | A1* | 2/2013 | Kim | H04W 4/06 |
| | | | | 370/329 |
| 2015/0146677 | A1* | 5/2015 | Ito | H04W 4/70 |
| | | | | 370/329 |
| 2016/0150564 | A1* | 5/2016 | Quan | H04L 61/6054 |
| | | | | 370/329 |

OTHER PUBLICATIONS

Rapporteur (Ericsson); [87#31][LTE/ProSe] How the Group Index is included in the BSR; 3GPP TSG-RAN WG2 #87bis; R2-144476; Oct. 6-10, 2014; Shanghai, P.R. China.

ASUSTeK; Discussion on Random Access for D2D; 3GPP TSG-RAN WG2 Meeting #88; R2-144979; Nov. 17-21, 2014; San Francisco, USA.

International Search Report issued in PCT/JP2016/063394; dated Jun. 14, 2016.

Technical Specification Group Radio Access Network, Study on Enhancements to Machine-Type Communications (MTC) and other Mobil Data Applications, 3GPP TR 37.869 V1.0.0, Aug. 2013, http://www.3gpp.org, 7 pages.

LG Electronics Inc., "BSR and UL grant in Msg2", 3GPP TSG-RAN2 Meeting #74, R2-113250, May 9-13, 2011, Barcelona, Spain, 4 pages.

\* cited by examiner

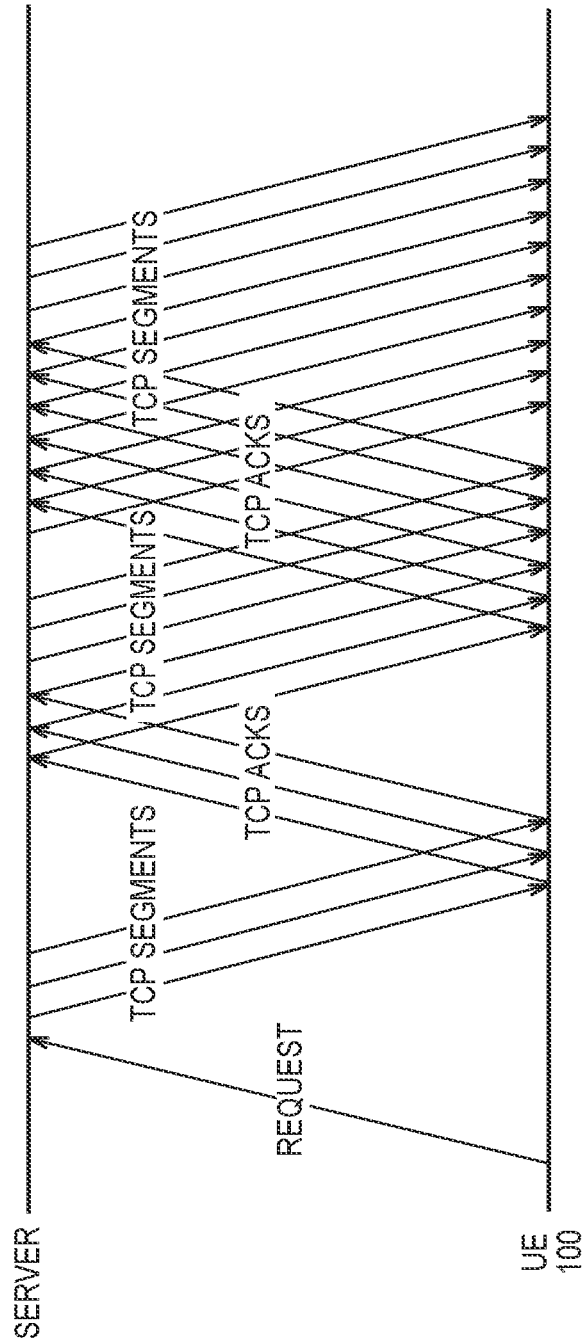

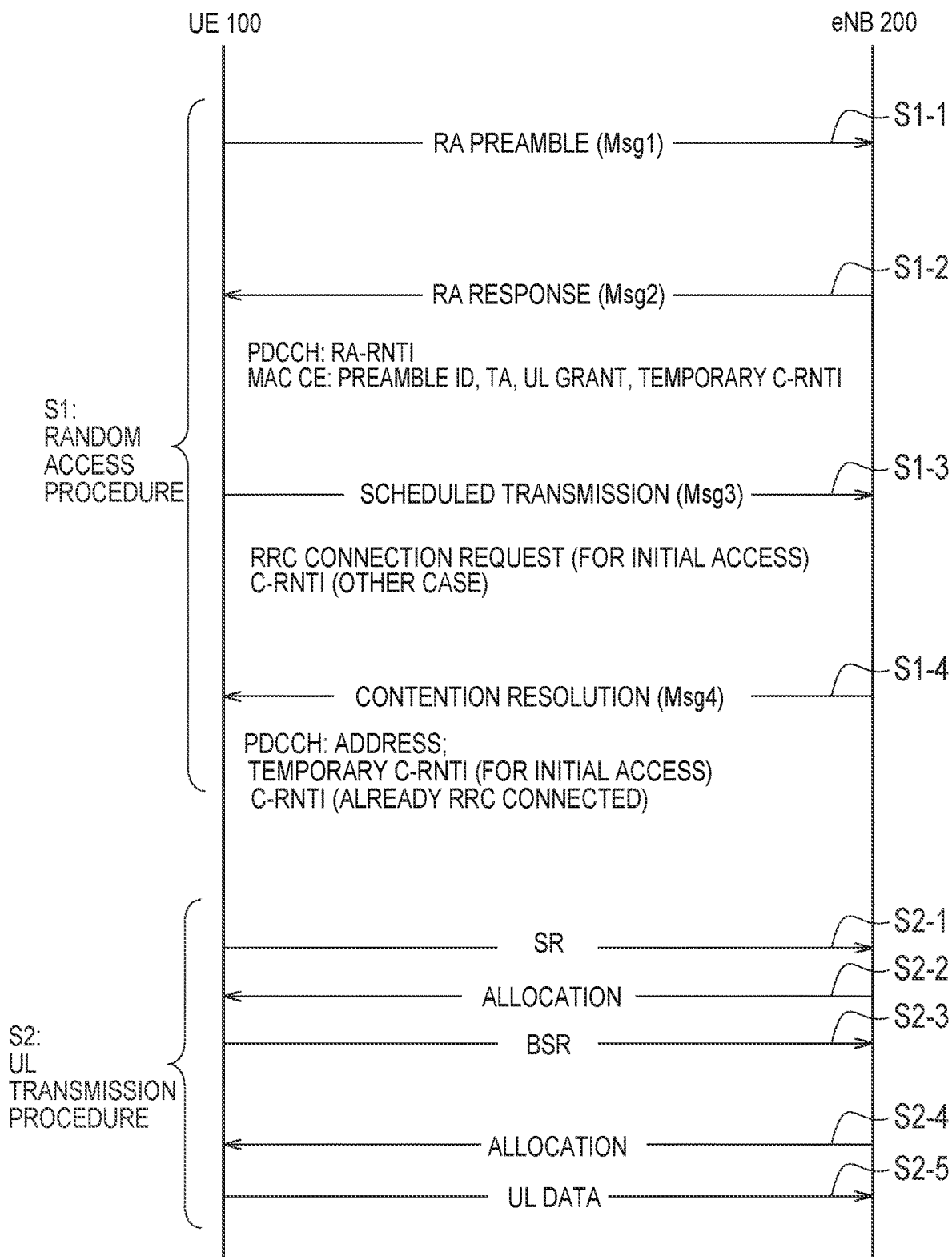

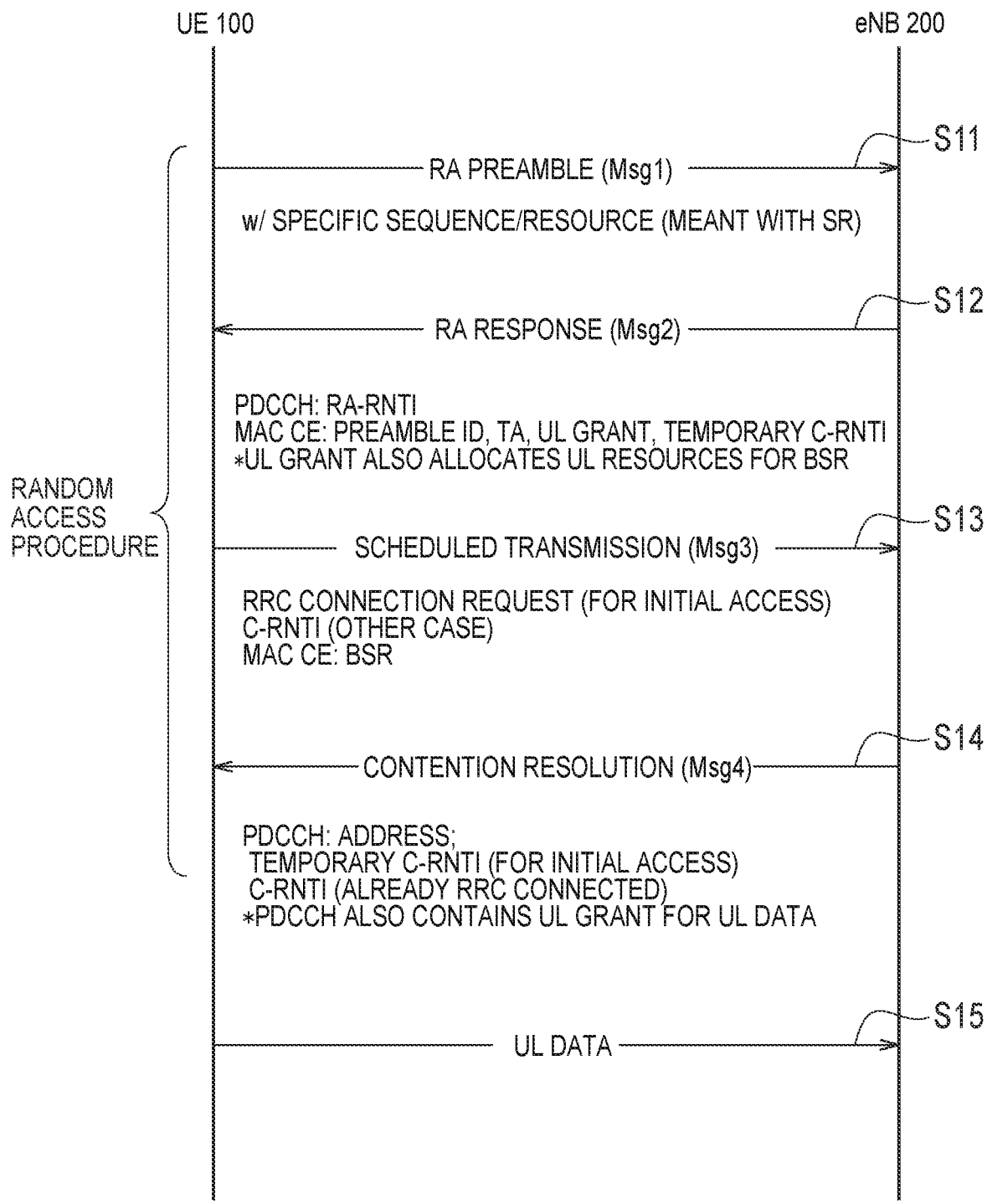

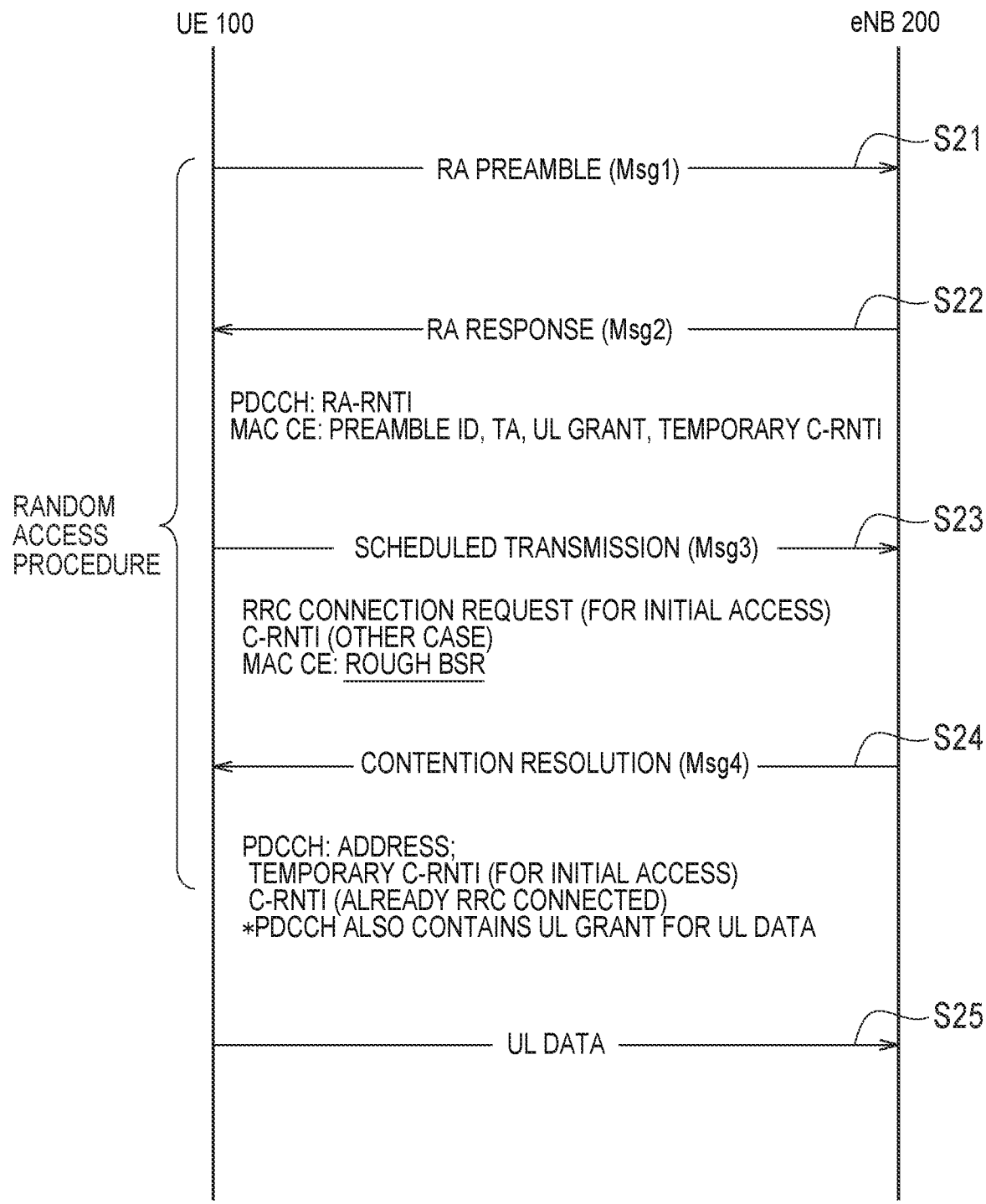

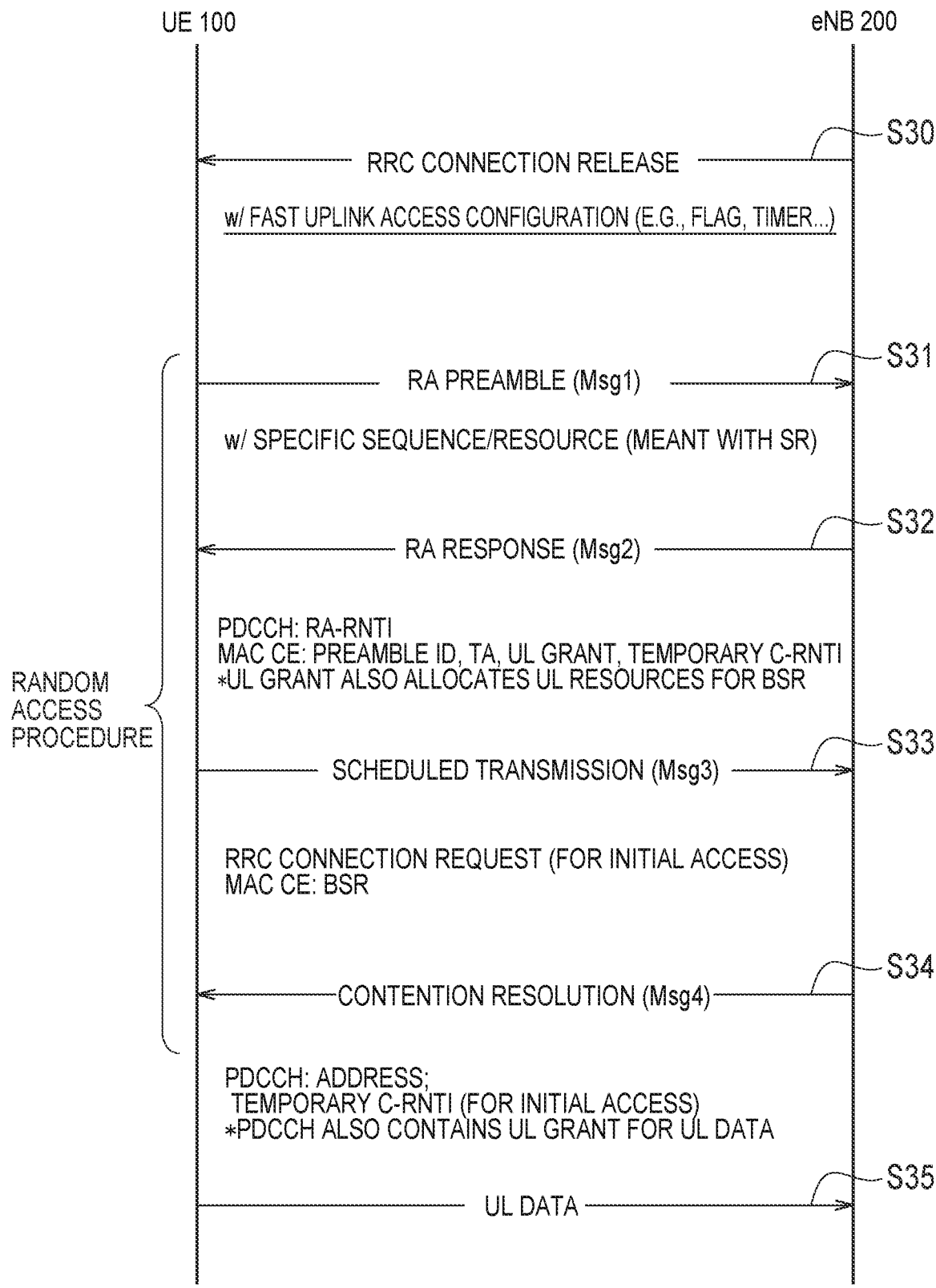

FIG. 12
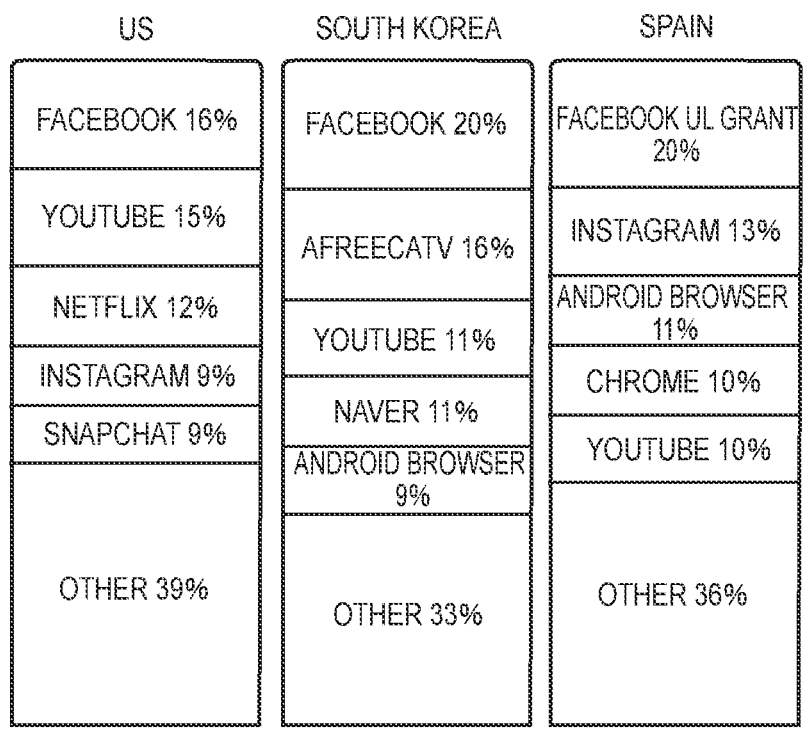
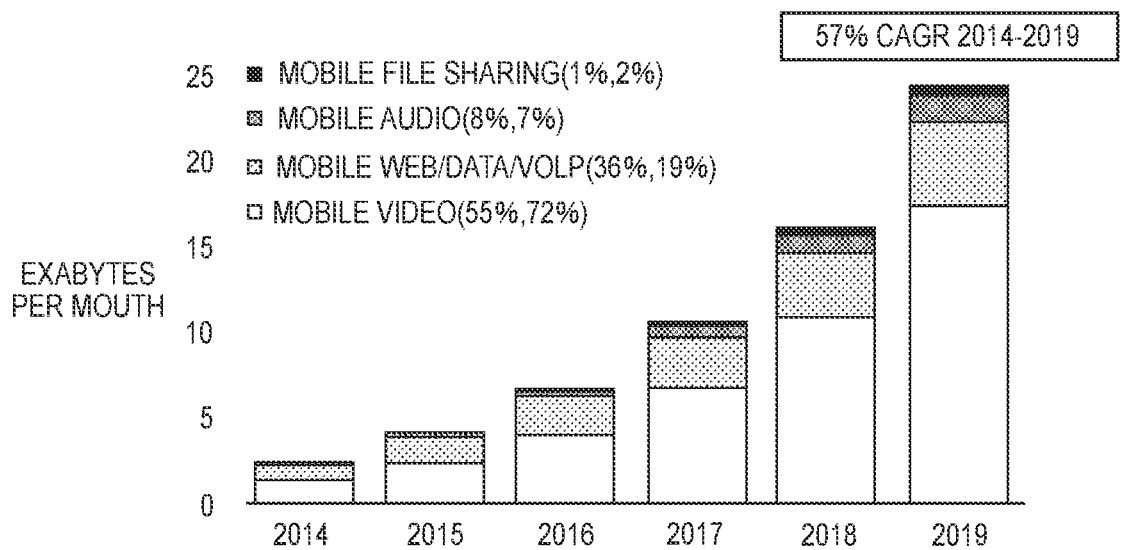

RADIO TERMINAL, BASE STATION, AND PROCESSOR

RELATED APPLICATION

This application is a continuation application of international application PCT/JP2016/063394, filed Apr. 28, 2016, which claims the benefit of U.S. Provisional Application No. 62/162,184 (filed May 15, 2015), the entire contents of which are incorporated herein by reference.

TECHNICAL FIELD

The present disclosure relates to a radio terminal, a base station, and a processor that are used in a mobile communication system.

BACKGROUND ART

In the Third Generation Partnership Project (3GPP), which is a mobile communication system standardization project, the introduction of a latency reducing function of reducing latency in radio communication is considered. As techniques for realizing such a latency reducing function, there are a fast uplink access technique, Transmission Time Interval (TTI) shortening technique, and the like.

SUMMARY

A radio terminal according to an embodiment includes a controller configured to control a random access procedure. The random access procedure includes first processing of transmitting a random access preamble to a base station, second processing of receiving a random access response from the base station, and third processing of performing uplink transmission to the base station based on the random access response. The controller is configured to notify, in the first processing or the third processing, the base station of an amount of uplink data in a transmission buffer of the radio terminal.

A base station according to an embodiment includes a controller configured to control a random access procedure. The random access procedure includes first processing of receiving a random access preamble from a radio terminal, second processing of transmitting a random access response to the radio terminal, and third processing of receiving, from the radio terminal, uplink transmission that is based on the random access response. The controller is configured to acquire, in the first processing or the third processing, from the radio terminal, an amount of uplink data in a transmission buffer of the radio terminal.

A processor according to an embodiment controls a radio terminal configured to perform a random access procedure. The random access procedure includes first processing of transmitting a random access preamble to a base station, second processing of receiving a random access response from the base station, and third processing of performing uplink transmission to the base station based on the random access response. The processor is configured to notify, in the first processing or the third processing, the base station of an amount of uplink data in a transmission buffer of the radio terminal.

BRIEF DESCRIPTION OF DRAWINGS

FIG. 7 is a diagram for illustrating an overview of a Transmission Control Protocol (TCP).

FIG. 8 is a sequence diagram illustrating a general random access procedure and a transmission procedure of uplink.

FIG. 9 is a sequence diagram illustrating pattern 1 of a random access procedure according to an embodiment.

FIG. 10 is a sequence diagram illustrating pattern 2 of the random access procedure according to the embodiment.

FIG. 11 is a sequence diagram illustrating pattern 3 of the random access procedure according to the embodiment.

FIG. 12 is a diagram according to an additional statement of the embodiment.

DESCRIPTION OF EMBODIMENTS

Overview of Embodiments

Figure 1:
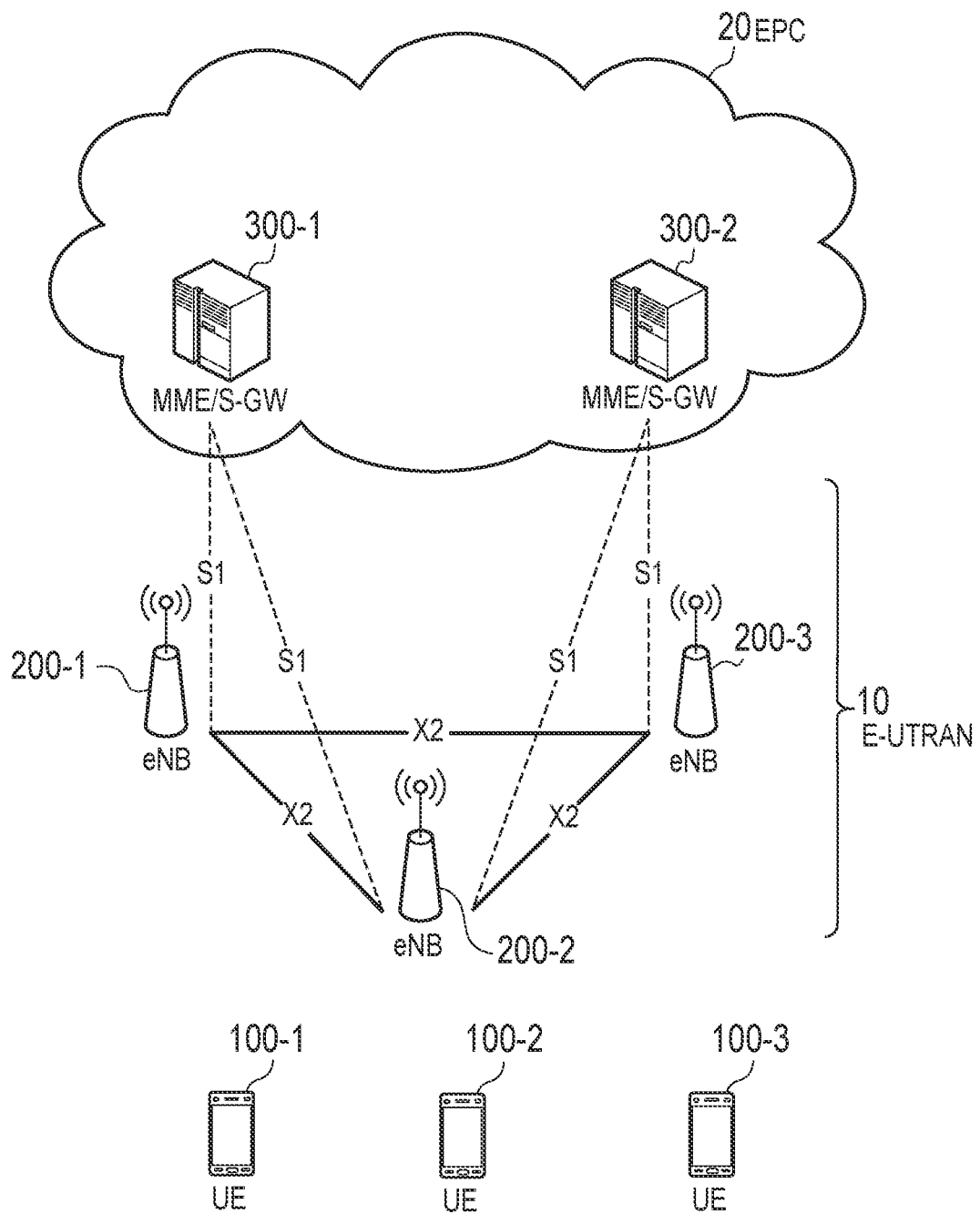
FIG. 1 is a diagram illustrating a Long Term Evolution (LTE) system (mobile communication system) according to an embodiment.

A general transmission procedure of uplink includes the following first to third steps.

In the first step, a radio terminal transmits, to a base station, a scheduling request (SR) for requesting a Physical Uplink Shared Channel (PUSCH) resource, using a Physical Uplink Control Channel (PUCCH) resource. In response to the reception of the SR, the base station allocates the PUSCH resource to the radio terminal.

In the second step, using the PUSCH resource allocated from the base station, the radio terminal transmits, to the base station, a buffer status report (BSR) including buffer information indicating an amount of uplink data in a transmission buffer of the radio terminal. In response to the reception of the BSR, the base station allocates an appropriate amount of the PUSCH resource to the radio terminal.

In the third step, using the PUSCH resource allocated from the base station, the radio terminal transmits uplink data in the transmission buffer of the radio terminal, to the base station.

On the other hand, if an uplink synchronization state is non-synchronised (Non-synchronised), the radio terminal in an RRC connected mode performs a random access procedure for performing uplink transmission. In addition, the radio terminal in the RRC connected mode performs the random access procedure for performing initial connection (Initial access).

After the end of the random access procedure, the radio terminal can transmit uplink data to a base station by performing the aforementioned transmission procedure of uplink (i.e., the first to third steps). Nevertheless, the method of performing the transmission procedure of uplink (the first to third steps) after the random access procedure has room for improvement in that latency of uplink is to be reduced, that is, fast uplink access is to be enabled.

In the following embodiment, a technique for enabling the fast uplink access is disclosed.

A radio terminal according to an embodiment includes a controller configured to control a random access procedure. The random access procedure includes first processing of transmitting a random access preamble to a base station, second processing of receiving a random access response from the base station, and third processing of performing uplink transmission to the base station based on the random access response. The controller is configured to notify, in the first processing or the third processing, the base station of an amount of uplink data in a transmission buffer of the radio terminal.

A base station according to an embodiment includes a controller configured to control a random access procedure. The random access procedure includes first processing of receiving a random access preamble from a radio terminal, second processing of transmitting a random access response to the radio terminal, and third processing of receiving, from the radio terminal, uplink transmission that is based on the random access response. The controller is configured to acquire, in the first processing or the third processing, from the radio terminal, an amount of uplink data in a transmission buffer of the radio terminal.

A processor according to an embodiment controls a radio terminal configured to perform a random access procedure. The random access procedure includes first processing of transmitting a random access preamble to a base station, second processing of receiving a random access response from the base station, and third processing of performing uplink transmission to the base station based on the random access response. The processor is configured to notify, in the first processing or the third processing, the base station of an amount of uplink data in a transmission buffer of the radio terminal.

Embodiment (1) Configuration of Mobile Communication System

FIG. 1 is a diagram illustrating a configuration of a Long Term Evolution (LTE) system being a mobile communication system according to an embodiment. As illustrated in FIG. 1, the LTE system includes a User Equipment (UE) 100, an Evolved-UMTS Terrestrial Radio Access Network (E-UTRAN) 10, and an Evolved Packet Core (EPC) 20.

The UE 100 corresponds to a radio terminal. The UE 100 is a mobile communication apparatus, and performs radio communication with a cell (serving cell).

The E-UTRAN 10 corresponds to a radio access network. The E-UTRAN 10 includes an evolved Node-B (eNB) 200. The eNB 200 corresponds to a base station. The eNBs 200 are connected to each other via an X2 interface.

The eNB 200 manages one or a plurality of cells, and performs radio communication with the UE 100 that has established connection with the own cells. The eNB 200 has a radio resource management (RRM) function, a routing function of user data (hereinafter, simply referred to as "data"), a measurement control function for mobility control and scheduling, and the like. The "cell" is used as a term indicating the minimum unit of a radio communication area, and furthermore, also used as a term indicating a function of performing radio communication with the UE 100.

The EPC 20 corresponds to a core network. The EPC 20 includes a Mobility Management Entity (MME)/Serving-Gateway(S-GW) 300. The MME performs various types of mobility control for the UE 100, and the like. The S-GW performs transfer control of data. The MME/S-GW 300 is connected with the eNB 200 via an S1 interface. The E-UTRAN 10 and the EPC 20 form a network.

(2) Configuration of Radio Terminal

Figure 2:
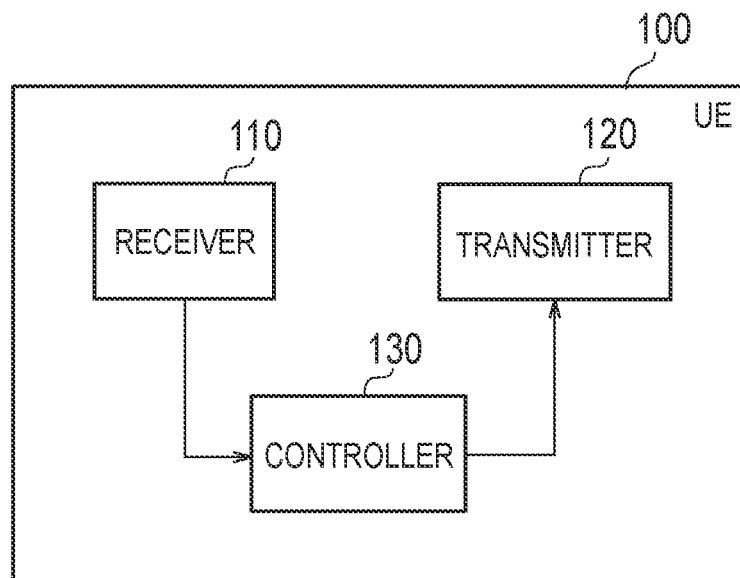
FIG. 2 is a block diagram of a user equipment (UE)(radio terminal) according to the embodiment.

FIG. 2 is a block diagram of the UE 100 (radio terminal). As illustrated in FIG. 2, the UE 100 includes a receiver 110, a transmitter 120, and a controller 130.

The receiver 110 performs various types of reception under the control of the controller 130. The receiver 110 includes an antenna and a receiving device. The receiving device converts a radio signal received by the antenna, into a baseband signal (reception signal), and outputs the baseband signal to the controller 130.

The transmitter 120 performs various types of transmission under the control of the controller 130. The transmitter 120 includes an antenna and a transmission device. The transmission device converts a baseband signal (transmission signal) output by the controller 130, into a radio signal, and transmits the radio signal from the antenna.

The controller 130 performs various types of control in the UE 100. The controller 130 includes a processor and a memory. The memory stores a program to be executed by the processor, and information to be used in processing performed by the processor. The processor includes a baseband processor that performs modulation/demodulation and encoding/decoding of a baseband signal, and the like, and a central processing unit (CPU) that executes programs stored in the memory, to perform various types of processing. The processor may include a codec that performs encoding/decoding of an audio/video signal. The processor executes the aforementioned processing and processing to be described later.

(3) Configuration of Base Station

Figure 3:
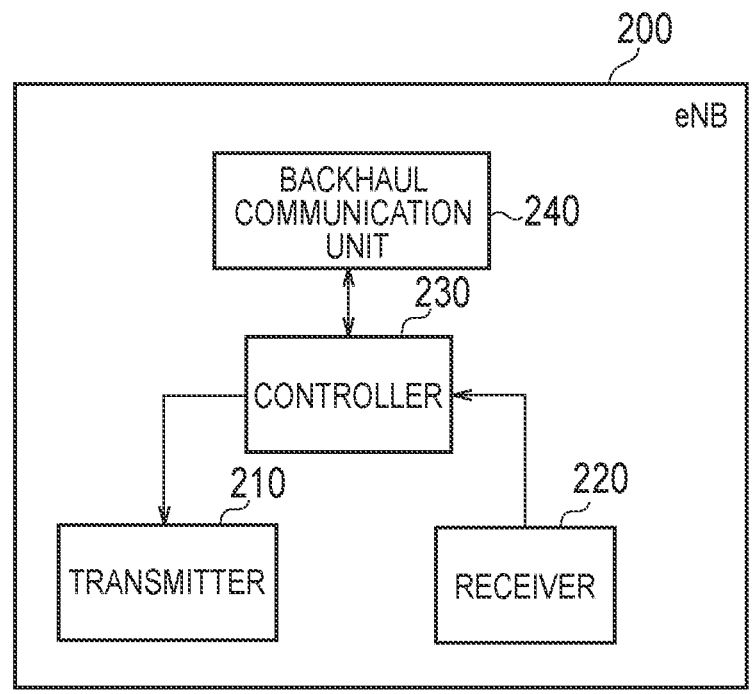
FIG. 3 is a block diagram of an evolved Node-B (eNB) (base station) according to the embodiment.

FIG. 3 is a block diagram of the eNB 200 (base station). As illustrated in FIG. 3, the eNB 200 includes a transmitter 210, a receiver 220, a controller 230, and a backhaul communication unit 240.

The transmitter 210 performs various types of transmission under the control of the controller 230. The transmitter 210 includes an antenna and a transmission device. The transmission device converts a baseband signal (transmission signal) output by the controller 230, into a radio signal, and transmits the radio signal from the antenna.

The receiver 220 performs various types of reception under the control of the controller 230. The receiver 220 includes an antenna and a receiving device. The receiving device converts a radio signal received by the antenna, into a baseband signal (reception signal), and outputs the baseband signal to the controller 230.

The controller 230 performs various types of control in the eNB 200. The controller 230 includes a processor and a memory. The memory stores a program to be executed by the processor, and information to be used in processing performed by the processor. The processor includes a baseband processor that performs modulation/demodulation and encoding/decoding of a baseband signal, and the like, and a central processing unit (CPU) that executes programs stored in the memory, to perform various types of processing. The processor executes the aforementioned processing and processing to be described later.

The backhaul communication unit 240 is connected with an adjacent eNB 200 via the X2 interface, and connected with the MME/S-GW 300 via the S1 interface. The backhaul communication unit 240 is used for communication performed on the X2 interface, communication performed on the S1 interface, and the like.

(4) Radio Interface

Figure 4:
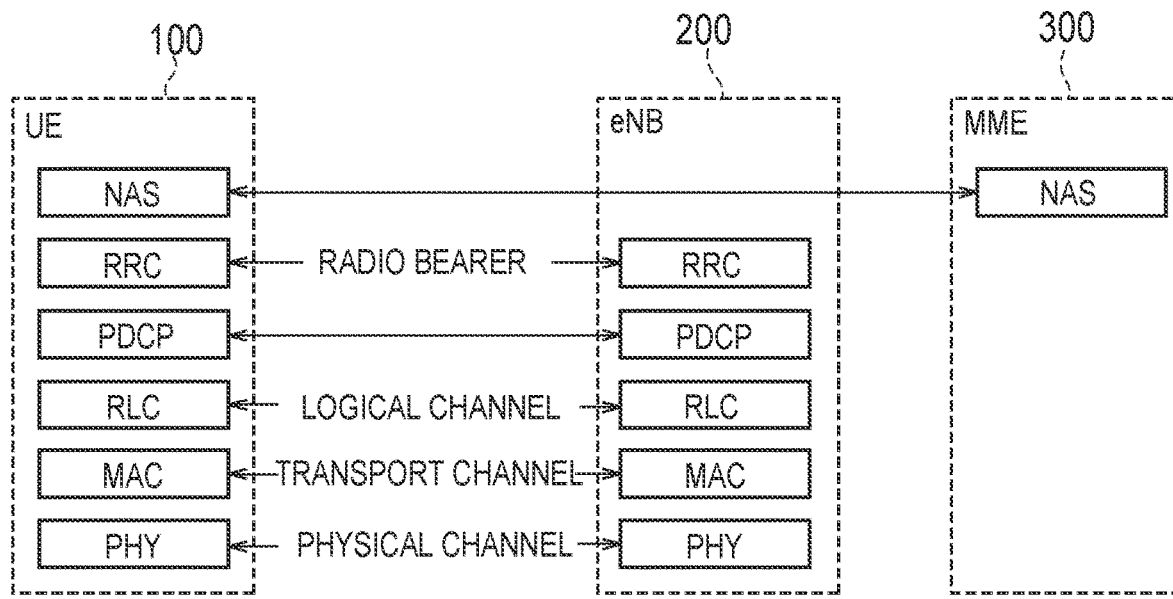
FIG. 4 is a protocol stack diagram of a radio interface in the LTE system.

FIG. 4 is a protocol stack diagram of a radio interface in the LTE system. As illustrated in FIG. 4, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control information are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control information are transferred via a transport channel. The MAC layer of the eNB 200 includes a scheduler for deciding a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control information. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected mode. If not, the UE 100 is in an RRC idle mode.

A non-access stratum (NAS) layer located above the RRC layer performs session management, mobility management, and the like.

The UE 100 includes the fourth to seventh layers of the OSI reference model as higher protocols of the radio interface protocol. A transport layer being the fourth layer includes a Transmission Control Protocol (TCP). The TCP will be described later.

(5) Overview of LTE Lower Layer

Figure 5:
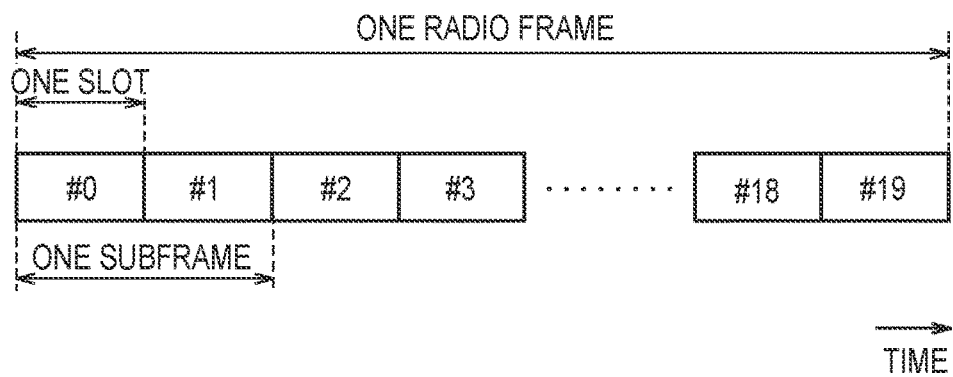
FIG. 5 is a configuration diagram of a radio frame used in the LTE system.

FIG. 5 is a configuration diagram of a radio frame used in the LTE system. In the LTE system, Orthogonal Frequency Division Multiple Access (OFDMA) and Single Carrier Frequency Division Multiple Access (SC-FDMA) are applied to downlink and uplink, respectively.

As illustrated in FIG. 5, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction, and a plurality of symbols in the time direction. Each resource block includes a plurality of subcarriers in the frequency direction. One resource element (RE) is constituted by one symbol and one subcarrier. In addition, among radio resources (time/frequency resources) to be allocated to the UE 100, a frequency resource can be identified by resource blocks and a time resource can be identified by subframes (or slots).

In downlink, a section corresponding to beginning several symbols of each subframe is a region used as a physical downlink control channel (PDCCH) for transferring mainly downlink control information, and a physical HARQ Indicator channel (PHICH) for transferring HARQ ACK/NACK. In addition, a remaining part of each subframe is a region that can be used as a physical downlink shared channel (PDSCH) for transferring mainly downlink data.

Basically, the eNB 200 transmits downlink control information (DCI) to the UE 100 using the PDCCH, and transmits downlink data to the UE 100 using the PDSCH. The downlink control information conveyed by the PDCCH includes uplink scheduling information, downlink scheduling information, and a TPC command. The uplink scheduling information is scheduling information (UL grant) related to the allocation of an uplink radio resource, and the downlink scheduling information is scheduling information related to the allocation of a downlink radio resource. The TPC command is information instructing the increase and decrease of transmission power of the uplink. For identifying a UE 100 which is a transmission destination of downlink control information, the eNB 200 includes a CRC bit scrambled using an identifier (Radio Network Temporary ID (RNTI)) of the transmission destination UE 100, in the downlink control information. For downlink control information that has a possibility of being addressed to an own UE, each UE 100 descrambles the CRC bit using the RNTI of the own UE, and then performs CRC check, and thereby blind decodes the PDCCH, to detect downlink control information addressed to the own UE. The PDSCH conveys downlink data using a downlink radio resource (resource block) indicated by the downlink scheduling information.

In uplink, both end portions in the frequency direction of each subframe are regions used as a physical uplink control channel (PUCCH) for transferring mainly uplink control information. A remaining part of each subframe is a region that can be used as a physical uplink shared channel (PUSCH) for transferring mainly uplink data.

Basically, the UE 100 transmits uplink control information (UCI) to the eNB 200 using the PUCCH, and transmits uplink data to the eNB 200 using the PUSCH. The uplink control information carried by the PUCCH includes a Channel Quality Indicator (CQI), a Precoding Matrix Indicator (PMI), a Rank Indicator (RI), a Scheduling Request (SR), and the HARQ ACK/NACK. The CQI is an index indicating channel quality of the downlink, and is used for deciding an MCS to be used in downlink transfer, and the like. The PMI is an index indicating a precoder matrix desirably used for transferring the downlink. The RI is an index indicating the number of layers (the number of streams) that can be used for transferring the downlink. The SR is information requesting the allocation of the PUSCH resource. The HARQ ACK/NACK is delivery confirmation information indicating whether downlink data has been correctly received.

(6) Overview of SR

The UE 100 transmits, to the eNB 200, an SR for requesting a PUSCH resource, using the PUCCH resource. In response to the reception of the SR, the eNB 200 allocates the PUSCH resource to the UE 100 (i.e., transmits "UL grant" to the UE 100).

According to $N^{(1)}_{PUCCH,SRI}$ being a PUCCH parameter configured from the eNB 200 by RRC signaling, the UE 100 decides a PUCCH resource for SR transmission. The parameter is a parameter specific to a UE.

In addition, an SR configuration (SR configuration) including a transmission periodicity of the SR (SR periodicity) and a subframe offset of the SR (SR subframe offset) is defined by "SR configuration index" being a parameter configured in the UE 100 from the eNB 200 by RRC signaling. The parameter is a parameter specific to a UE. An example of "SR configuration" is shown in Table 1.

TABLE 1

| SR configuration Index $I_{SR}$ | SR periodicity (ms) $SR_{PERIODICITY}$ | SR subframe offset $N_{OFFSET,SR}$ |
|---|---|---|
| 0-4 | 5 | $I_{SR}$ |
| 5-14 | 10 | $I_{SR} - 5$ |
| 15-34 | 20 | $I_{SR} - 15$ |
| 35-74 | 40 | $I_{SR} - 35$ |
| 75-154 | 80 | $I_{SR} - 75$ |
| 155-156 | 2 | $I_{SR} - 155$ |
| 157 | 1 | $I_{SR} - 157$ |

In the example in Table 1, a periodicity (SR periodicity) of the PUCCH resource for SR transmission falls within a range of 1 [ms] to 80 [ms].

For example, the UE 100 can transmit an SR in each subframe satisfying the following formula (1).

[Mathematical Formula 1]

$$(10 \times n_f + \lfloor n_s/2 \rfloor - N_{OFFSET,SR}) \bmod SR_{PERIODICITY} = 0 \quad (1)$$

In the formula, "$n_f$" denotes a system frame number (radio frame number), "$n_s$" denotes a slot number in a frame (zeroth to 19th), "$N_{OFFSET,SR}$" denotes subframe offset (SR subframe offset), and "$SR_{PERIODICITY}$" denotes an SR periodicity (SR periodicity).

(7) Overview of BSR

Using the PUSCH resource allocated from the eNB 200, the UE 100 transmits a BSR to the eNB 200. The BSR includes buffer information (Buffer Size) indicating an amount of uplink data in a transmission buffer (UL buffer) of the UE 100. The BSR is one kind of a MAC control element transmitted from the MAC layer of the UE 100 to the MAC layer of the eNB 200. The BSR MAC control element supports a first format and a second format. The first format is used for transmission of a "Short BSR" and a "Truncated BSR". The second format is used for transmission of a "Long BSR".

Figure 6A:
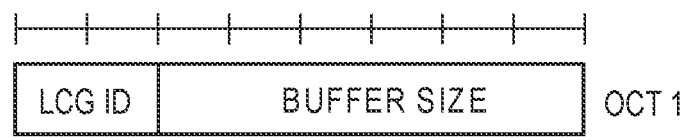
FIGS. 6A and 6B are diagrams for illustrating a BSR MAC control element.
Figure 6B:
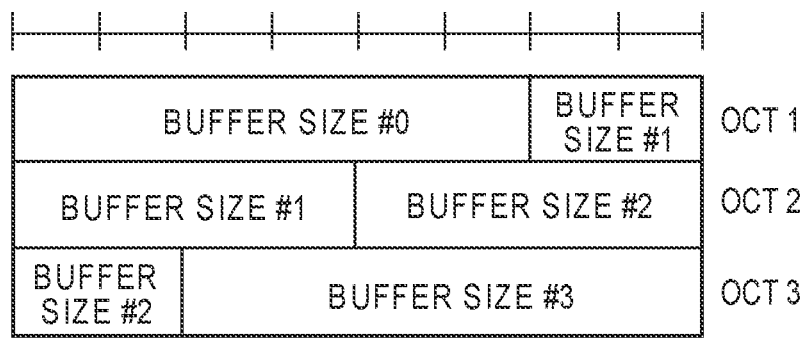

FIGS. 6A and 6B are diagrams for illustrating the BSR MAC control element.

As illustrated in FIG. 6A, the first format of the BSR MAC control element includes one "LCG ID" field and one "Buffer Size" field. The "LCG ID" is an ID for identifying a group of a logical channel, and has a bit length of two bits. The "Buffer Size" is an index indicating a data amount of all logical channels in a group corresponding to the "LCG ID", and has a bit length of six bits. An example of correspondence relationship between indices and data amounts (buffer size values) is shown in Table 2.

TABLE 2

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

As illustrated in FIG. 6B, the second format of the BSR MAC control element includes four "Buffer Size" fields. The "Buffer Size" fields are provided so as to correspond to "LCG ID #0" to "LCG ID #3". According to the second format of the BSR MAC control element, respective data amounts of the four "LCG IDs" can be indicated by one BSR.

(8) Overview of TCP

FIG. 7 is a diagram for illustrating an overview of the TCP. In the embodiment, the UE 100 performs TCP communication with a server on the Internet via a network of the LTE system.

As illustrated in FIG. 7, the server determines a congestion status of the network based on "TCP ACK" from the UE 100. The server gradually increases a window size in response to the reception of "TCP ACK". The window size is an amount of "TCP Segment" consecutively transmitted without waiting for "TCP ACK". On the other hand, the server halves the window size if the reception of "TCP ACK" has failed (timed out). Such control is referred to as "slow start".

Thus, even if the downlink of the LTE system is not congested, TCP throughput of downlink cannot be enhanced unless the UE 100 immediately transmits "TCP ACK" in uplink. In other words, if a delay time (latency of uplink) from when "TCP ACK" is generated in the UE 100 to when the transmission of "TCP ACK" to the eNB 200 is completed can be shortened, TCP throughput of downlink can be enhanced. Here, for transmitting "TCP ACK" from the UE 100 to the eNB 200, it is necessary to allocate an appropriate amount of uplink resources (more specifically, PUSCH resources) to the UE 100 from the eNB 200.

(9) General Random Access Procedure and Transmission Procedure of Uplink

A general random access procedure and a transmission procedure of uplink will be described below. FIG. 8 is a sequence diagram illustrating a general random access procedure and a transmission procedure of uplink. In an initial state in FIG. 8, the UE 100 is in the RRC connected mode or an RRC idle mode.

As illustrated in FIG. 8, if an uplink synchronization state is non-synchronised (Non-synchronised), the UE 100 in the RRC connected mode performs the random access procedure (step S1) for performing uplink transmission. In addition, the UE 100 in the RRC connected mode performs the random access procedure (step S1) for performing initial connection (Initial access). After the end of the random access procedure (step S1), the UE 100 transmits uplink data (UL data) to the eNB 200 by performing the transmission procedure of uplink (step S2).

More specifically, in step S1-1, the UE 100 transmits a random access preamble (RA preamble) to the eNB 200 on a PRACH, as first processing of the random access procedure. The "RA Preamble" is sometimes referred to as Msg1. The "RA Preamble" is a signal for performing random access from the UE 100 to the eNB 200 in the MAC layer. The eNB 200 receives the "RA Preamble".

In step S1-2, the eNB 200 transmits a random access response (RA Response) to the UE 100 on a DL-SCH, as second processing of the random access procedure. The "RA Response" is one kind of the MAC control element (MAC CE), and is sometimes referred to as Msg2. More specifically, the eNB 200 estimates uplink delay between the UE 100, based on the "RA Preamble" received from the UE 100. In addition, the eNB 200 decides an uplink radio resource to be allocated to the UE 100. Then, the eNB 200 transmits, to the UE 100, an "RA Response" including a timing correction value (Timing Advance (TA)) that is based on the result of delay estimation, allocation information of radio resources (UL grant), a preamble identifier (Preamble ID), and a "Temporary C-RNTI". In addition, the "Preamble ID" is an ID indicating a signal sequence of the "RA Preamble" received from the UE 100. In addition, in the PHY layer (PDCCH), a dedicated RNTI (RA-RNTI) is used for the transmission of the "RA Response". The UE 100 receives the "RA Response".

In step S1-3, the UE 100 performs uplink transmission (Scheduled Transmission) to the eNB 200 on a UL-SCH based on the "RA Response", as third processing of the random access procedure. The "Scheduled Transmission" is sometimes referred to as Msg3. In the case of initial connection (Initial access), the "Scheduled Transmission" is an "RRC Connection Request" message. In other cases (i.e., if a C-RNTI is allocated to the UE 100), the "Scheduled Transmission" is a message including the C-RNTI of the UE 100. The eNB 200 receives the "Scheduled Transmission".

In step S1-4, the eNB 200 transmits a contention resolution (Contention Resolution) message to the UE 100 as the third processing of the random access procedure. The "Contention Resolution" message is sometimes referred to as Msg4. The "Contention Resolution" message includes the content of the message received from the UE 100 in step S1-3. In the case of initial connection (Initial access), in the physical layer (PDCCH), a "Temporary C-RNTI" is used for the transmission of the "Contention Resolution" message. If a C-RNTI is allocated to the UE 100, in the physical layer (PDCCH), the "C-RNTI" is used for the transmission of the "Contention Resolution" message. The UE 100 receives the "Contention Resolution" message.

In this manner, the random access procedure (step S1) includes steps S1-1 to S1-4. Next, the transmission procedure of uplink (step S2) will be described.

In step S2-1, the UE 100 transmits, to the eNB 200, an SR for requesting the allocation of the PUSCH resource, on the PUCCH.

In step S2-2, in response to the reception of the SR, the eNB 200 allocates the PUSCH resource to the UE 100. More specifically, the eNB 200 transmits, to the UE 100, DCI including scheduling information of uplink (UL grant), on the PDCCH.

In step S2-3, using the PUSCH resource allocated from the eNB 200, the UE 100 transmits, to the eNB 200, a BSR including buffer information indicating an amount of uplink data in the transmission buffer of the UE 100.

In step S2-4, in response to the reception of the BSR, the eNB 200 allocates an appropriate amount of the PUSCH resource to the UE 100. More specifically, the eNB 200 transmits, to the UE 100, DCI including scheduling information of uplink (UL grant), on the PDCCH.

In step S2-5, using the PUSCH resource allocated from the eNB 200, the UE 100 transmits, to the eNB 200, uplink data (e.g., TCP ACK packet) in the transmission buffer of the UE 100.

In this manner, the transmission procedure of uplink (step S2) includes steps S2-1 to S2-5.

Nevertheless, the method of performing the transmission procedure of uplink (step S2) after the random access procedure (step S1) has room for improvement in that latency of uplink is to be reduced, that is, fast uplink access is to be enabled.

(10) Random Access Procedure According to Embodiment

The random access procedure according to the embodiment will be described below.

(10.1) Pattern 1

FIG. 9 is a sequence diagram illustrating pattern 1 of a random access procedure according to an embodiment. The description will now be given mainly based on a difference from FIG. 8.

As illustrated in FIG. 9, in step S11, the UE 100 transmits a random access preamble (RA preamble) to the eNB 200 on a PRACH, as the first processing of the random access procedure. In the first processing, the UE 100 requests the eNB 200 to allocate radio resources for transmitting a report (BSR) to the eNB 200. For example, the UE 100 transmits a special "RA Preamble" using a specific signal sequence or resource (Specific sequence/resource). Here, the specific signal sequence is a signal sequence belonging to a specific preamble group, for example. The specific resource is a specific PRACH Mask Index", for example. Such a special "RA Preamble" can be regarded as an "RA Preamble" for fast uplink access. More specifically, the special "RA Preamble" is an "RA Preamble" to which a function of the SR is added. The eNB 200 receives the special "RA Preamble".

In step S12, the eNB 200 transmits a random access response (RA Response) to the UE 100 on a DL-SCH, as the second processing of the random access procedure. Information included in the "RA Response" is similar to information included in the "RA Response" in the general random access procedure. Nevertheless, in the embodiment, in response to the reception of the special "RA Preamble", the eNB 200 allocates not only radio resources for normal "Scheduled Transmission", but also radio resources for BSR transmission to the UE 100, and includes allocation information (UL grant) indicating theses radio resources, in the "RA Response". The UE 100 receives the "RA Response".

In step S13, the UE 100 performs uplink transmission (Scheduled Transmission) to the eNB 200 on a UL-SCH based on the "RA Response", as the third processing of the random access procedure. In the third processing, the UE 100 notifies the eNB 200 of an amount of uplink data in the transmission buffer of the UE 100 by transmitting the BSR to the eNB 200. The eNB 200 receives the BSR from the UE 100 together with "Scheduled Transmission".

In step S14, the eNB 200 transmits a contention resolution (Contention Resolution) message to the UE 100 as the third processing of the random access procedure. Here, in response to the reception of the BSR, the eNB 200 allocates, to the UE 100, radio resources (PUSCH resources) for transmitting uplink data (UL data), and transmits allocation information (UL grant) indicating the radio resource, to the UE 100 on the PDCCH. The UE 100 receives "UL grant" from the eNB 200 together with the "Contention Resolution" message.

In step S15, upon receiving "UL grant" for transmitting uplink data (UL data), from the eNB 200, the UE 100 ends the random access procedure, and transmits the uplink data to the eNB 200. The eNB 200 receives the uplink data from the UE 100 when the random access procedure ends.

In this manner, according to the random access procedure according to the embodiment, the UE 100 can transmit information similar to the SR, and the BSR, to the eNB 200 in the process of the random access procedure. Thus, the UE 100 can immediately transmit uplink data to the eNB 200 without transmitting the SR and the BSR to the eNB 200 after the random access procedure. More specifically, according to the sequence illustrated in FIG. 9, steps S2-1 to S2-4 in FIG. 8 can be omitted. Thus, according to the random access procedure according to the embodiment, fast uplink access can be enabled.

(10.2) Pattern 2

FIG. 10 is a sequence diagram illustrating pattern 2 of the random access procedure according to the embodiment. The description will now be given mainly based on a difference from FIG. 8. Pattern 2 is a pattern obtained by simplifying part of the sequence of pattern 1.

As illustrated in FIG. 10, steps S21 and S22 of this pattern are similar to those in the general random access procedure illustrated in FIG. 8.

In step S23, the UE 100 performs uplink transmission (Scheduled Transmission) to the eNB 200 on a UL-SCH based on the "RA Response", as the third processing of the random access procedure. In the third processing, the UE 100 notifies the eNB 200 of an amount of uplink data in the transmission buffer of the UE 100 by transmitting the BSR to the eNB 200. The BSR transmitted here is a rough BSR (Rough BSR) as compared with a general BSR, and has a short bit length as compared with that of the general BSR. For example, if an uplink data amount (buffer size) is represented by an index of two bits, an index "00" represents less than "100 bytes", an index "01" represents "equal to or larger than 100 bytes and less than 500 bytes", an index "10" represents "equal to or larger than 500 bytes and less than 500 k bytes", and an index "11" represents "equal to or larger than 500 k bytes and less than 1 M bytes". Alternatively, indices may designate a BSR table as shown in Table 2. For example, the index "00" represents "Indices 0 to 15" in the BSR table, the index "01" represents "Indices 16 to 31" in the BSR table, the index "10" represents "Indices 32 to 47" in the BSR table, and the index "11" represents "Indices 48 to 63" in the BSR table. In addition, an example in which the BSR table is equally divided into four has been described here. Nevertheless, division is not limited to quadrisection. The eNB 200 receives the "Rough BSR" from the UE 100 together with the "Scheduled Transmission".

In step S24, the eNB 200 transmits a contention resolution (Contention Resolution) message to the UE 100 as the third processing of the random access procedure. Here, in response to the reception of the "Rough BSR", the eNB 200 allocates, to the UE 100, radio resources (PUSCH resources) for transmitting uplink data (UL data), and transmits allocation information (UL grant) indicating the radio resource, to the UE 100 on the PDCCH. The UE 100 receives "UL grant" from the eNB 200 together with the "Contention Resolution" message.

In step S25, upon receiving "UL grant" for transmitting uplink data (UL data), from the eNB 200, the UE 100 ends the random access procedure, and transmits the uplink data to the eNB 200. The eNB 200 receives the uplink data from the UE 100 when the random access procedure ends.

(10.3) Pattern 3

FIG. 11 is a sequence diagram illustrating pattern 3 of the random access procedure according to the embodiment. The description will now be given mainly based on a difference from FIG. 8. Pattern 3 is a pattern mainly targeted for initial connection (Initial access). In an initial state in FIG. 11, the UE 100 is in the RRC connected mode.

As illustrated in FIG. 11, in step S30, the UE 100 receives, from the eNB 200, an "RRC Connection Release" message for releasing RRC connection with the eNB 200, and transitions to the RRC idle mode. The "RRC Connection Release" message includes configuration information (Configuration) of fast uplink access (Fast Uplink Access). The UE 100 stores the Configuration. The Configuration includes a flag indicating application/nonapplication of the Configuration, and a timer value indicating an effective time of the Configuration. Alternatively, a special random access preamble may be designated by the Configuration.

In step S31, based on the stored Configuration, the UE 100 transmits a random access preamble (RA preamble) to the eNB 200 on a PRACH, as the first processing of the random access procedure. In the first processing, the UE 100 transmits the special "RA Preamble". Subsequent operations (steps S32 to S35) are similar to those in pattern 1, but follow operations for initial connection (Initial access).

(11) Summing-Up of Embodiment

According to the random access procedure according to the embodiment, the UE 100 can notify the eNB 200 of an uplink data amount (buffer size) in the process of the random access procedure. Thus, the UE 100 can immediately transmit uplink data to the eNB 200 without transmitting the BSR to the eNB 200 after the random access procedure. Thus, fast uplink access can be enabled.

Other Embodiments

In the aforementioned embodiment, a BSR has been described as an example of information indicating an amount of data buffered by the UE. Nevertheless, the information is not limited to this. An amount indicating uplink data buffered in the UE may be applied. For example, a notice of an amount of data buffered by each layer of the UE including an application layer may be transmitted.

In the aforementioned embodiment, the UE 100 notifies the eNB 200 of an uplink data amount (buffer size) in the third processing (Scheduled Transmission) of the random access procedure. Nevertheless, the UE 100 may notify the eNB 200 of an uplink data amount (buffer size) in the first processing (RA Preamble) of the random access procedure. For example, a buffer size is associated with a combination of a signal sequence (sequence) and a resource (PRACH Mask Index) of the "RA Preamble". Such association is predefined by specifications, for example. The UE 100 selects a combination of the signal sequence (sequence) and the resource (PRACH Mask Index) according to a buffer size, and transmits an "RA Preamble" to the eNB 200 using the selected combination. Based on a combination of the signal sequence (sequence) and the resource (PRACH Mask Index) that is applied to the "RA Preamble" received from the UE 100, the eNB 200 can identify a buffer size.

In the aforementioned embodiments, the LTE system has been described as an example of a mobile communication system. Nevertheless, the present disclosure is not limited to the LTE system. The present disclosure may be applied to a system other than the LTE system.

Additional Statement (1. Introduction)

New research items related to the latency reduction technique for LTE have been approved. The purpose of this research is to identify two technical fields for reducing packet data latency as described below.

Fast uplink access solution [RAN2]:

TTI shortening and reduced processing time [RAN1]:

The fast uplink access solution is expected to improve resource efficiency as compared with several practical techniques including keeping current TTI length and processing time, that is, TTI shortening, and several practical techniques not including the maintenance.

In this additional statement, initial study of research related to the fast uplink access solution is provided.

(2. Discussion)

(2.1. Working Hypothesis)

Motivation documents of this research indicate that a current standardized mechanism for uplink resource allocation compresses latent throughput performance of LTE from the viewpoint of TCP throughput. A reduction in TCP throughput is caused by round-trip time latency, that is, a TCP slow start algorithm caused by TCP-ACK transmission in UL. Thus, the fast uplink access solution is expected to improve user experience provided by a higher layer structured in a TCP layer. For the working hypothesis, SID mentions the fast uplink access solution.

The research field includes resource efficiency including air interface capacity, battery lifetime, a control channel resource, specification impact, and technical possibilities. Both an FDD duplex mode and a TDD duplex mode are considered.

As a first aspect, latent gains such as a reduced response time and improved TCP throughput that are caused by latency improvement related to typical applications and use cases are identified and documented. In this evaluation, the RAN2 can hypothesize a latency reduction caused by protocol strengthening, similarly to shortened TTI. In conclusion, this aspect of this research indicates which latency reduction is desirable [RAN2].

The solution is expected to improve network capacity, UE power consumption, and a control channel resource. In particular, improved TCP throughput can be considered as a major performance indicator.

Consideration 1: DL TCP throughput is expected to be improved by UL latency reduction solution.

In the case of an aspect specific to the fast uplink access solution;

attention is to be paid to reducing user plane latency for scheduled UL transmission for an active UE and a UE that has been nonactive but been kept in an RRC connection connected for a long time, and obtaining solution having higher resource efficiency according to protocol strengthening and signaling strengthening, as compared with pre-scheduling solution permitted by an existing standard for both of keeping and not keeping the current TTI length and processing time.

The active UE is assumed to consecutively transmit/receive data. Thus, the UE is considered to be in an active time. In other words, DRX is not applied because a nonactive timer is operating.

Consideration 2: a UE in the active time is considered.

The UE that has been in non-active but been kept in the RRC connected for a long time can be interpreted as needing to transmit at least an SR and a BSR for the UE applying a long DRX cycle and executing uplink transmission. Furthermore, if a time alignment timer TAT ends, the UE starts a random access procedure before the SR transmission. This reduces user experience, that is, an actual response time.

Consideration 3: a UE including application of a long DRX cycle and not having UL permission is considered.

Consideration 4: if the UE is in non-active for a long time, the time alignment timer can end.

Even if the current TTI length and processing length are assumed, the fast uplink access solution should have higher resource efficiency as compared with the pre-scheduling solution. The TTI shortening is more general solution, and is expected to reduce latency of not only downlink delivery but also of uplink access latency, owing to increased HARQ interaction.

Consideration 5: fast uplink solution has gains independent of a TTI shortening approach.

The motivation documents describe that possible approaches for fast uplink access are based on pre-scheduling being a practical technique, and an eNB allocates an uplink resource before SR reception according to the pre-scheduling. Nevertheless, even if a UE does not include uplink data to be transmitted, the pre-scheduling technique consumes radio resources in an uplink control channel (i.e., PUSCH) and a downlink control channel (i.e., PDCCH). It is also discussed that, if existing SPS is used for pre-scheduling, the UE needs to transmit padding data for avoiding implicit release of a configured SPS resource. Thus, the motivation documents have proposed that a standardized approach is expected to strengthen the pre-scheduling technique. This can include non-padding in a case in which prior permission, mechanisms similar to SPS, and data are not available, and/or a smooth shift to dynamic scheduling.

Consideration 6: the standardized approach is expected to strengthen resource efficiency as compared with the practical techniques.

(2.2. Typical Use Case)

A recent increase in mobile traffic is caused by the growth of mobile video traffic, and according to a public report, this tendency is predicted to dominate future traffic. It is well-known that video streaming typically uses TCP (HTTP by TCP) except for live streaming (by UDP). Thus, the case of using video streaming conforms to the range of this research.

In addition, the report points out that social networking and web browsing are the second most dominant applications of mobile traffic, and these applications are therefore typically structured by HTTP, and accordingly use TCP. As many 3GPP representatives already communicate, 3GPP FTP service can be consecutively accessed by each representative for downloading Tdocs used by TCP. Thus, behaviors in applications structured in HTTP or FTP should be considered to be those in the typical use case.

Proposal 1: user behaviors in applications structured in HTTP and FTP should be considered to be those in the typical use case in this research.

FIG. 12 is a diagram illustrating top five applications in mobile traffic volume and mobile application analysis.

Figure 13:
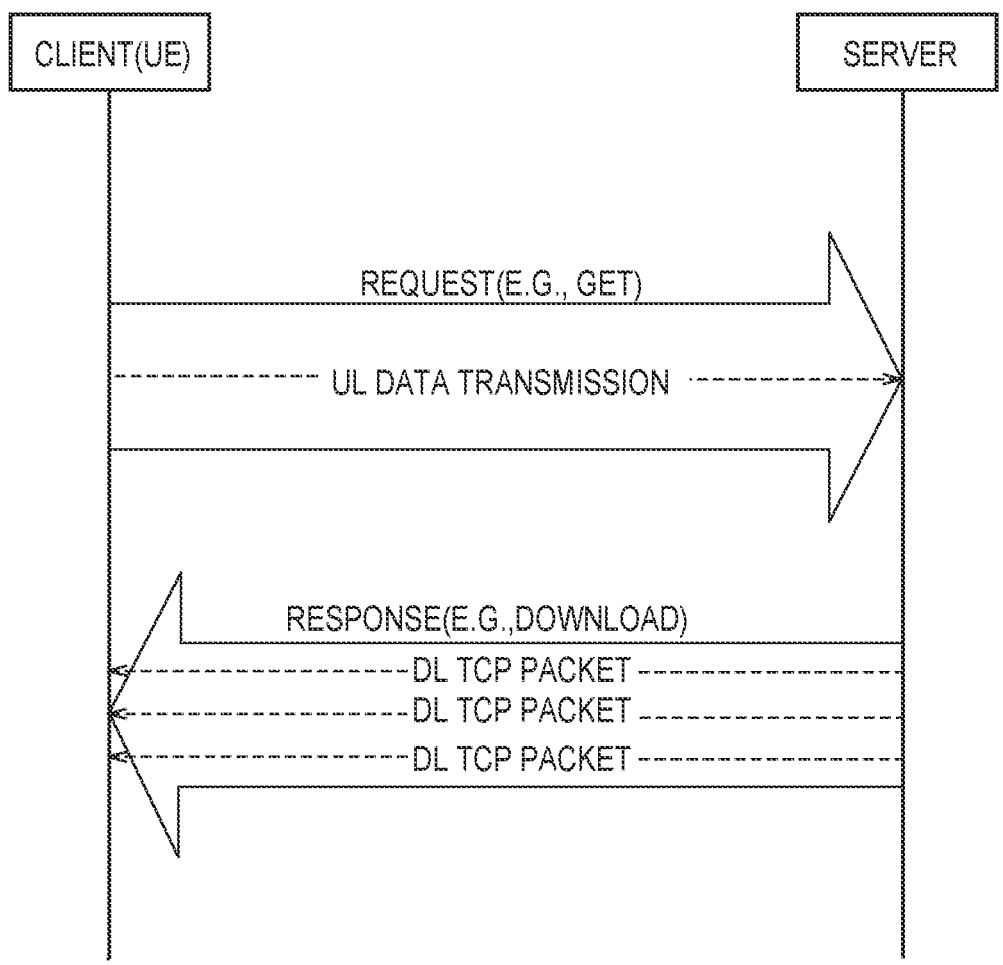
FIG. 13 is a diagram according to the additional statement of the embodiment.

The most typical behavior in such applications can be modeled as a request/response dialogue. For example, if a user desires to download a file using the FTP, a client first transmits an RETR command (also known as, GET) to a server, and after that, file download starts. The same behavior can also be applied to the HTTP. With this configuration, as illustrated in FIG. 13 as an example, an web browser first transmits GET, and after that, an web page is downloaded when the user opens the web page. If typical behaviors are considered, the RAN2 needs to discuss whether initial uplink data transmission preceding a corresponding DL TCP packet (e.g., request such as GET) is simply assumed, or strengthening should be performed also in the fast uplink access solution.

Proposal 2: the RAN2 needs to discuss whether initial uplink data transmission preceding a corresponding DL TCP packet is simply assumed, or strengthening should be performed also in the fast uplink access solution.

FIG. 13 is a diagram illustrating modeling in the typical use case that uses the HTTP/FTP.

(2.3. Essential Issue)

Figure 14:
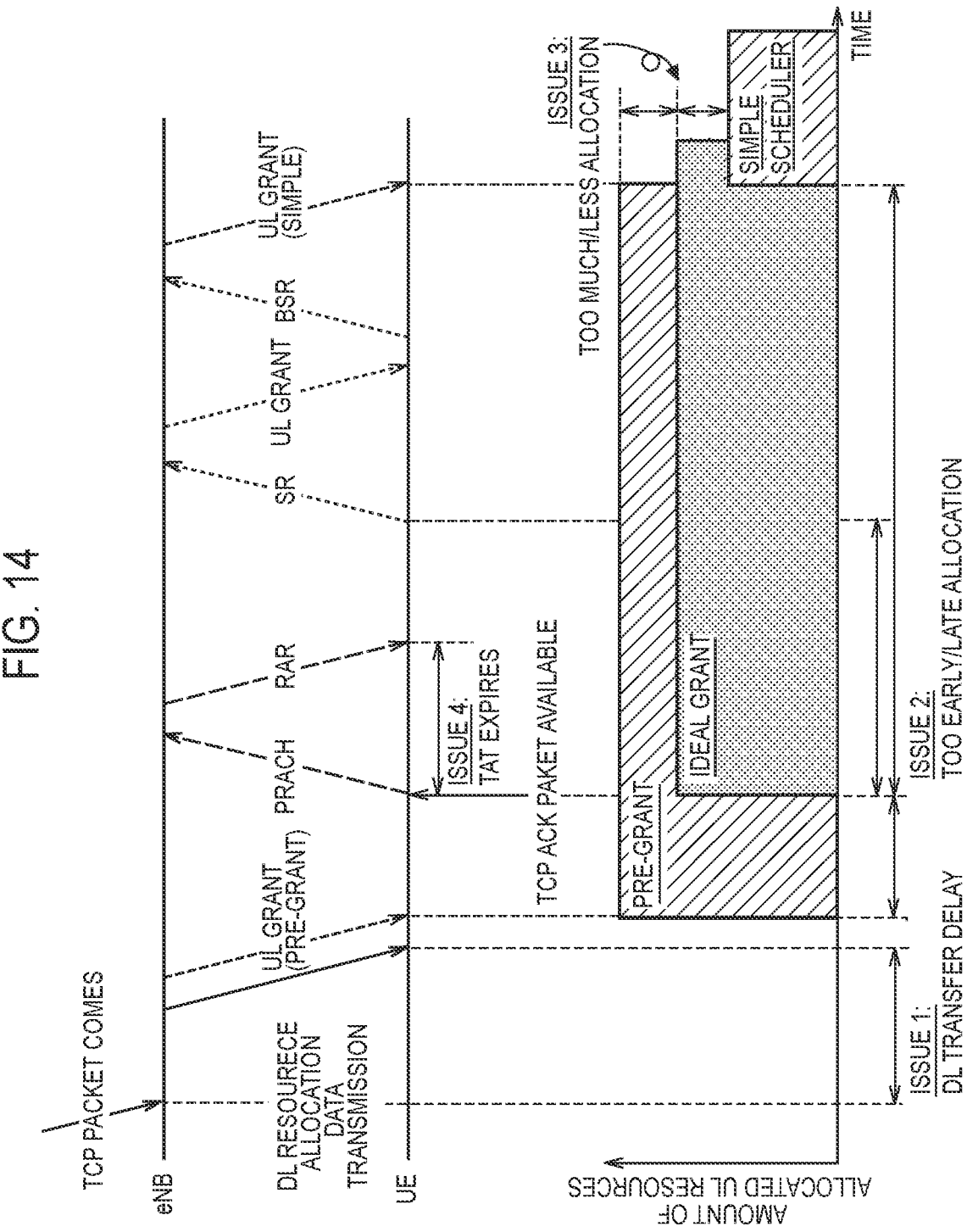
FIG. 14 is a diagram according to the additional statement of the embodiment.

As mentioned in 2.1, serious issues leading to uplink access latency cannot be solved by any of the pre-scheduling technique, or a prior permission technique that uses strengthened SPS. FIG. 14 illustrates, as examples, three serious issues to be dealt with by the fast uplink access solution (refer to FIG. 14).

Serious issue 1: DL transfer delay

The DL transfer delay is caused by a long DRX cycle. At worst, a service providing cell needs to wait 10 to 2560 subframes for a transmission chance after DL TCP packet reception.

Serious issue 2: Too early/late allocation

Too early allocation can be caused by the pre-scheduling technique or a prior permission approach preceding SR reception. On the other hand, too late allocation can be caused by allocating uplink resources for a TCP ACK packet (accordingly, seven subframes subsequent to SR transmission of UE) according to an SR periodicity, that is, SR periodicity *sr-ProhibitTimer, or based on too-simple scheduler execution, that is, corresponding BSR reception.

Serious issue 3: Too much/less allocation

Too much/less allocation can be caused by the pre-scheduling technique or a prior permission approach preceding a BSR. The scheduler needs to idolatrously allocate uplink resources without knowing a buffer status of the UE.

Serious issue 4: Initial uplink delay

As mentioned in Consideration 4, if the TAT ends, the UE should start the random access procedure before all uplink transmissions.

As a matter of course, wise application techniques can reduce some of negative impacts caused by the three serious issues, such as, for example, understanding inside of DL IP packet, and allocating uplink resources based on the use of previous uplink permission. Nevertheless, the standardized approach is expected to solve almost all of the above-listed issues, but not all the issues.

Proposal 3: DL transfer delay, too early/late allocation, too much/less allocation, and a TAT end should be optimized by the fast uplink access solution.

(2.4. Latent Solution Approach)

As discussed in 2.3, the serious issues are never solved unless the DRX, SR, BSR, and/or procedures are reconsidered. These issues are never dealt with even if the prior permission approach that uses strengthened SPS is applied. This is because mismatch between actual permission and ideal allocation (FIG. 14) causes a reduction in resource efficiency including air interface capacity, battery lifetime, and a control channel resource.

Consideration 7: the prior permission approach can have good performance as compared with the existing practical techniques, but never solves these serious issues.

For solving these serious issues, the following solution approaches can be considered.

For example, expanded OnDuration handling in DRX for fast DL allocation that is triggered by initial UL transmission (i.e., GET).

For example, a reduction of signaling round trip for initial UL packet transmission that is caused by the integration of the SR and the BSR.

A shorter SR periodicity with less impact on spectral efficiency [RAN1].

For example, RACH procedure strengthening that uses an additional function for UL data permission.

Thus, the RAN2 should research not only the UL permission mechanism itself, but also procedures related to UL permission.

Proposal 4: the RAN2 should also research strengthening of DRX, SR, BSR, and RACH.

3. Conclusion

In this additional statement, the working hypothesis has been discussed based on the description of the approved working items. The typical use case and modeling thereof are provided. The four serious issues and latent solution approaches are identified for this research.

The invention claimed is:
1. A user equipment comprising:
a controller including a processor and a memory communicatively coupled to the processor, the processor configured to:
transmit a Msg 3 message to a base station during a random access procedure, wherein the Msg 3 message includes a first MAC control element (CE)

including a field containing one index indicating an amount of uplink data in a transmission buffer of the user equipment; and transmit a second MAC CE to the base station not during the random access procedure, wherein the second MAC CE includes a field containing one index indicating an amount of uplink data in a transmission buffer of the user equipment, wherein a bit length of the field containing the one index included in the first MAC CE included in the Msg 3 message transmitted during the random access procedure is shorter than a bit length of the field containing the one index included in the second MAC CE transmitted not during the random access procedure, and the bit length of the field containing the one index included in the second MAC CE transmitted not during the random access procedure is 6 bits.

2. The user equipment according to claim 1, wherein the one index contained in the field included in the first MAC CE indicates an amount of all uplink data that is available for transmission in Radio Link Control (RLC) layer, in Packet Data Convergence Protocol (PDCP) layer, and in Radio Resource Control (RRC) layer of the user equipment, and the one index contained in the field included in the second MAC CE indicates an amount of uplink data of one logical channel group of the user equipment.

3. A base station comprising:

a controller including a processor and a memory communicatively coupled to the processor, the processor configured to:

receive a Msg 3 message from a user equipment during a random access procedure, wherein the Msg 3 message includes a first MAC control element (CE) including a field containing one index indicating an amount of uplink data in a transmission buffer of the user equipment; and receive a second MAC CE from the user equipment not during the random access procedure, wherein the second MAC CE includes a field containing one index indicating an amount of uplink data in a transmission buffer of the user equipment, wherein a bit length of the field containing the one index included in the first MAC CE included in the Msg 3 message transmitted during the random access procedure is shorter than a bit length of the field containing the one index included in the second MAC CE transmitted not during the random access procedure, and the bit length of the field containing the one index included in the second MAC CE transmitted not during the random access procedure is 6 bits.

4. A radio communication method, comprising:

transmitting a Msg 3 message to a base station by a user equipment during a random access procedure, wherein the Msg 3 message includes a first MAC control element (CE) including a field containing one index indicating an amount of uplink data in a transmission buffer of the user equipment; and transmitting a second MAC CE to the base station by the user equipment, not during the random access procedure, wherein the second MAC CE includes a field containing one index indicating an amount of uplink data in a transmission buffer of the user equipment, wherein a bit length of the field containing the one index included in the first MAC CE included in the Msg 3 message transmitted during the random access procedure is shorter than a bit length of the field containing the one index included in the second MAC CE transmitted not during the random access procedure, and the bit length of the field containing the one index included in the second MAC CE transmitted not during the random access procedure is 6 bits.

* * * * *